US009090772B2

(12) United States Patent
Tonelli et al.

(10) Patent No.: US 9,090,772 B2
(45) Date of Patent: Jul. 28, 2015

(54) COMPOSITIONS OF IONISABLE FLUOROPOLYMERS

(75) Inventors: Claudio Adolfo Pietro Tonelli, Paderno d'Adda (IT); Solange Barbieri, Baranzate (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 0 days.

(21) Appl. No.: 14/237,129

(22) PCT Filed: Jul. 24, 2012

(86) PCT No.: PCT/EP2012/064462
§ 371 (c)(1),
(2), (4) Date: Feb. 4, 2014

(87) PCT Pub. No.: WO2013/017470
PCT Pub. Date: Feb. 7, 2013

(65) Prior Publication Data
US 2014/0213720 A1    Jul. 31, 2014

(30) Foreign Application Priority Data
Aug. 4, 2011    (EP) .................................... 11176624

(51) Int. Cl.
| | | |
|---|---|---|
| *C08L 75/08* | (2006.01) |
| *C09D 175/08* | (2006.01) |
| *C08G 18/50* | (2006.01) |
| *C08G 18/08* | (2006.01) |
| *C08G 65/00* | (2006.01) |
| *C08L 33/16* | (2006.01) |
| *C08F 220/18* | (2006.01) |
| *C08L 33/02* | (2006.01) |
| *C08G 18/73* | (2006.01) |
| *C08G 18/28* | (2006.01) |
| *C08G 18/32* | (2006.01) |
| *C08L 71/02* | (2006.01) |

(52) U.S. Cl.
CPC .............. *C08L 75/08* (2013.01); *C08F 220/18* (2013.01); *C08G 18/0823* (2013.01); *C08G 18/283* (2013.01); *C08G 18/3206* (2013.01); *C08G 18/3275* (2013.01); *C08G 18/5015* (2013.01); *C08G 18/73* (2013.01); *C08G 65/007* (2013.01); *C08L 33/02* (2013.01); *C08L 33/16* (2013.01); *C08L 71/02* (2013.01); *C09D 175/08* (2013.01)

(58) Field of Classification Search
None
See application file for complete search history.

(56) References Cited

U.S. PATENT DOCUMENTS

| | | |
|---|---|---|
| 3,242,218 A | 3/1966 | Miller |
| 3,715,378 A | 2/1973 | Sianesi et al. |
| 5,149,842 A | 9/1992 | Sianesi et al. |
| 5,258,110 A | 11/1993 | Sianesi et al. |
| 5,449,558 A | 9/1995 | Hasegawa et al. |
| 5,498,457 A | 3/1996 | Ishihara et al. |
| 6,403,223 B1 | 6/2002 | Albro et al. |
| 2009/0062551 A1 | 3/2009 | Tournilhac et al. |

FOREIGN PATENT DOCUMENTS

| | | |
|---|---|---|
| EP | 239123 A2 | 9/1987 |
| EP | 622353 A2 | 11/1994 |
| EP | 1138826 A2 | 10/2001 |
| EP | 1559733 A1 | 8/2005 |
| EP | 2098918 A2 | 9/2009 |
| GB | 1104482 A | 2/1968 |
| JP | 02249130 A | 10/1990 |
| JP | 2004018394 A | 1/2004 |
| WO | 0015686 A1 | 3/2000 |
| WO | 2004067588 A1 | 8/2004 |
| WO | 2007102993 A1 | 9/2007 |
| WO | 2008138927 A1 | 11/2008 |
| WO | 2008156917 A1 | 12/2008 |
| WO | 2010000715 A1 | 1/2010 |
| WO | 2010028226 A2 | 3/2010 |
| WO | 2011005672 A2 | 1/2011 |

OTHER PUBLICATIONS

Laffineur F. et al., "Formation of a bilayer film on gold substrates for connector applications: spectroscopic study of the deposition process", Journal of Materials Chemistry, 2005, vol. 15 (47), p. 5054-5062—The Royal Society of Chemistry.
Chung P.S. et al., "Molecular Spreading of Pure and Binary Mixture PFPE Nano Films on Carbon-Overcoated Disks", IEEE Transactions on Magnetics, Jun. 2010, vol. 46 (6), p. 2405-2408—IEEE.
Chung P.S. et al., "The Static and Dynamic Responses of Binary Mixture Perfluoropolyether Lubricant Films-Molecular Structural Effects", IEEE Transactions on Magnetics, Oct. 2009, vol. 45 (10), p. 3644-3647—IEEE.

*Primary Examiner* — Jeffrey Mullis

(57) ABSTRACT

The invention relates to a composition of ionisable fluoropolymers, in particular to polymer compositions comprising: a) at least one fluorinated ionisable polymer (A), which comprises recurring fluorinated blocks and recurring functional blocks, each of said recurring functional blocks comprising at least one ionisable anionic group, and in which polymer (A) at least one of the said recurring functional blocks is comprised between two fluorinated blocks; b) at least one fluorinated ionisable polymer (B), which comprises recurring fluorinated blocks and recurring functional blocks, each of said recurring functional blocks comprising at least one ionisable cationic group, and in which polymer (B) at least one of the said recurring functional blocks is comprised between two fluorinated blocks; wherein the ratio between the ionic equivalents of polymer (A) and the ionic equivalents of polymer (B) ranges from 1.1 to 0.9.

19 Claims, No Drawings

COMPOSITIONS OF IONISABLE FLUOROPOLYMERS

This application is a U.S. national stage entry under 35 U.S.C. §371 of International Application No. PCT/EP2012/064462 filed Jul. 24, 2012, which claims priority to European patent application No. 11176624.2, filed on Aug. 4, 2011. The entire contents of these applications are explicitly incorporated herein by this reference.

TECHNICAL FIELD

The present invention relates to fluoropolymer compositions, in particular to compositions comprising ionisable fluoropolymers.

BACKGROUND ART

Elastomeric compositions based on supramolecular polymer assemblies are known, for example, from US 2009062551 (ARKEMA FRANCE). This application discloses a material comprising at least one molecule with a molecular mass from 9 to 9000 g/mol, in particular a molecule derived from fatty acids, namely saturated or unsaturated carboxylic acids containing at least five carbon atoms, such as linear or branched diacids, and dimers or trimers of fatty acids of plant origin. Each molecule comprises at least three associative functional groups which allow to form intermolecular bonds; in particular, this prior art document discloses associative functional groups able to form hydrogen bonds. These materials become fluid above a certain temperature and, upon cooling, they exhibit again the properties of rubber elasticity and are said to be self-repairing. US 2009062521 does not disclose groups that contain ionisable groups able to form intermolecular ionic bonds.

WO 2010/000715 (SOLVAY SOLEXIS SPA) discloses compositions for imparting grease, oil- and water-repellence to substrates; the compositions comprise at least a (per)fluoropolyether derivative which contains at least one fluorinated block and at least one urethane block of formula:

wherein E is a divalent hydrocarbon group, optionally comprising one or more aromatic rings. The fluorinated block may contain at least one functional block comprising at least one ionisable group, like a sulfonic acid group, a carboxy group or an amino group. This document does not disclose or suggest compositions comprising (per)fluoropolyether derivatives with opposite charges, i.e. at least one (per)fluoropolyether derivative comprising fluorinated blocks containing at least one ionisable anionic group and at least one (per)fluoropolyether derivative comprising fluorinated blocks containing at least one ionisable cationic group in a defined ratio of ionic equivalents. Furthermore, the compositions disclosed in this document do not form materials endowed with elastomeric and/or self-healing properties.

WO 2008/138927 (SOLVAY SOLEXIS SPA) relates to fluorinated polyurethane compositions for imparting water- and oil-repellence and soil release properties to textile substrates. The polyurethane is a (per)fluoropolyether urethane comprising at least one fluorinated block and at least one functional block, wherein the functional block contains at least one ionisable group. The urethane moiety joining the fluorinated block and the functional block together complies with formula:

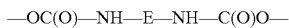

wherein E is a divalent hydrocarbon group, optionally comprising one or more aromatic rings. Similarly to WO 2010/000715, WO 2008/138927 does not disclose or suggest to prepare compositions based on (per)fluoropolyether polyurethanes with functional blocks having opposite charges in a defined ratio of ionic equivalents.

WO 2007/102993 (3M INNOVATIVE PROPERTIES CO) relates to surface active block copolymers, their use in the manufacture of a foam composition and articles comprising the polymerised foam composition. The fluorinated block polymers comprise a (per)fluorinated block and may also contain functional blocks typically having one or more polar groups, such as carboxy, sulphonic or amino groups. Neither the description, nor the examples specifically disclose or suggest compositions comprising block copolymers containing functional blocks having opposite charges in a defined ratio of ionic equivalents.

WO 2010/028226 (ARROWSTAR LLC) discloses compositions for imparting water and oil repellency to fibers, the compositions comprising a fluorinated polyurethane having a plurality of ionisable groups. This document discloses in particular a mixture of a cationic fluorinated polyurethane, namely Fluorolink® 5032 polyurethane, and an anionic fluorinated polyurethane, namely Fluorolink® P56 polyurethane; the compositions further comprise an acrylic polymer and are in the liquid form. Example 2, in particular, discloses a composition containing 8.8% by weight Fluorolink® 5032 polyurethane and 30.0% by weight Fluorolink® P56 polyurethane. From the Applicant's calculations, it appears that the two polymers are not present in a stoichiometric equivalent ratio of ionic groups with opposite charges. Indeed, the equivalent weight of Fluorolink® 5032 polyurethane is 0.25 eq/kg and the equivalent weight of Fluorolink® P56 polyurethane is 0.49 eq/kg; accordingly, in the compositions of example 2, the equivalent ratio between Fluorolink® 5032 polyurethane and Fluorolink® P56 polyurethane is calculated to be 0.2, while the equivalent ratio between Fluorolink® P56 polyurethane and Fluorolink® 5032 polyurethane is calculated to be 6.7.

U.S. Pat. No. 5,498,457 (HITACHI) relates to a magnetic recording medium having a lubricant layer comprising ionically interbonded fluoropolyethers with acidic and basic terminal groups; preferably, each fluoropolyether has at least two acidic terminal groups or basic terminal groups in one molecule. According to a specific embodiment, the fluoropolyether containing acidic terminal groups complies with formula

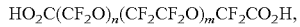

wherein m and n are integers, while the perfluoropolyether containing basic terminal groups complies with formula $H_2NHCH_2CHNO_2C(CF_2O)_n(CF_2CF_2O)_m CF_2CO_2NHCH_2CH_2NH_2$, where m and n are integers. U.S. Pat. No. 5,498,457 does not disclose or suggests polymer mixtures based on fluoropolyethers containing recurring fluoropolyether blocks and recurring cationic or anionic blocks wherein at least one of the cationic or anionic blocks is between two fluoropolyether blocks.

SUMMARY OF INVENTION

The present invention relates to a polymer composition comprising:
a) at least one fluorinated ionisable polymer (A), which comprises recurring fluorinated blocks and recurring functional blocks, each of said recurring functional blocks comprising at least one ionisable anionic group, and in which polymer (A) at least one of the said recurring functional blocks is comprised between two fluorinated blocks;

b) at least one fluorinated ionisable polymer (B), which comprises recurring fluorinated blocks and recurring functional blocks, each of said recurring functional blocks comprising at least one ionisable cationic group, and in which polymer (B) at least one of the said recurring functional blocks is comprised between two fluorinated blocks;

wherein the ratio between the ionic equivalents of polymer (A) and the ionic equivalents of polymer (B) ranges from 1.1 to 0.9. Preferably, the ratio is 1.

For the purposes of the present invention, the expression "recurring fluorinated blocks" means that a fluorinated block is repeated in the polymer structure; likewise, the expression "recurring functional blocks" means that the functional blocks are repeated in the polymer structure; according to one aspect of the invention, fluorinated blocks alternate with functional blocks.

It has indeed been observed that by using polymers (A) and (B) as defined above, wherein at least one functional block comprising at least one ionisable anionic or cationic group is comprised between two fluorinated blocks and by mixing said polymers (A) and (B) in the above defined ratio, it is possible to obtain ionically interconnected polymer networks that are more cohesive than those containing only one functional block containing an ionisable group at each polymer end and that are endowed with elastomeric properties.

A fluorinated block according to the present invention is preferably a (per)fluoropolyether block comprising a (per)fluoropolyoxylakylene chain [herein after also referred to as $(R_{OF})$ chain] which comprises, preferably consists of, recurring units having at least one catenary ether bond and at least one fluorocarbon moiety; typically, the $(R_{OF})$ chain comprises one or more randomly distributed repeating units R°, which are selected from the following groups:

(i) —CFXO—, wherein X is F or $CF_3$;
(ii) —$CF_2$CFXO—, wherein X is F or $CF_3$;
(iii) —$CF_2CF_2CF_2O$—;
(iv) —$CF_2CF_2CF_2CF_2O$—.

Preferably, the repeating units are selected from —$CF_2O$— and —$CF_2CF_2O$— units; still more preferably, the $R_{(OF)}$ chain consists of —$CF_2O$— and —$CF_2CF_2O$— units.

The molar ratio between —$CF_2O$— and —$CF_2CF_2O$— units ranges preferably from 0.1 to 10, more preferably from 0.5 to 5.

A functional block comprising at least one ionisable anionic group according to the present invention comprises, preferably consists of, a hydrocarbon chain [hereinafter referred to as chain $(R_H)$], optionally comprising one or more aromatic, heteroaromatic, cycloaliphatic or heterocycloaliphatic groups, said chain $(R_H)$ comprising at least one functional group which, under appropriate pH conditions, forms an anionic group bearing one ore more negative charges. Likewise, a functional block comprising at least one ionisable cationic group comprises, preferably consists of, a hydrocarbon chain [hereinafter referred to as chain $(R_H)$], optionally comprising one or more aromatic, heteroaromatic, cycloaliphatic or heterocycloaliphatic groups, said chain $(R_H)$ comprising at least one functional group which, under appropriate pH conditions, forms a cationic group bearing one ore more positive charges. In the present description, these functional blocks can be also referred to as "ionisable anionic blocks" and "ionisable cationic blocks" or "anionic blocks" and "cationic blocks" respectively, or can be referred to together as "ionisable blocks".

An "ionisable anionic group" is a functional group which, under appropriate pH conditions, forms an anionic group bearing one or more negative charges and an "ionisable cationic group" is a functional group which, under appropriate pH conditions, forms a cationic group bearing one or more positive charges.

In the compositions of the invention, polymer (A) and polymer (B) are present is such an amount that the total number of negative charges borne by the ionisable anionic groups in polymer (A) is from 10% lower to 10% higher than the total number of positive charges borne by the ionisable cationic groups in polymer (B) or vice versa. Preferably, the total number of negative charges borne by the ionisable anionic groups in polymer (A) is the same as the total number of positive charges borne by the ionisable cationic groups in polymer (B).

A first preferred embodiment of the invention is represented by compositions comprising polymers wherein the fluorinated blocks, preferably (per)fluoropolyether blocks, and the functional blocks are linked together by urethane moieties of formula (I) below:

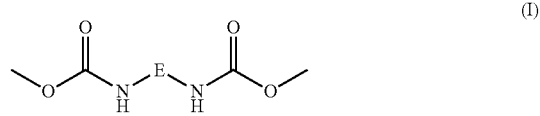

(I)

wherein E is a divalent hydrocarbon group, linear or branched, typically a $C_1$-$C_{12}$ hydrocarbon group, optionally comprising one or more cycloaliphatic, heterocycloaliphatic, aromatic or heteroaromatic groups, typically $C_3$-$C_{12}$ cycloaliphatic, $C_3$-$C_{12}$ heterocycloaliphatic, $C_5$-$C_{12}$ aromatic or $C_5$-$C_{12}$ heteroaromatic groups. As examples of heteroaromatic groups phosphazene, triazine and triazole can be mentioned in particular. Furthermore, group E may optionally contain further functional groups selected from isocyanate and carboxy groups. The polymers according to this first preferred embodiment will be also hereinafter referred to as polyurethane (PU) polymers.

According to a second preferred embodiment of the invention, the compositions comprise polymers wherein fluorinated blocks, preferably (per)fluoropolyether blocks and the functional blocks are linked together through an ester moiety of formula (II) below:

(II)

A preferred example of this second embodiment is represented by compositions comprising polymers in which (per)fluoropolyether blocks and functional blocks are linked together through a moiety of formula (IIA):

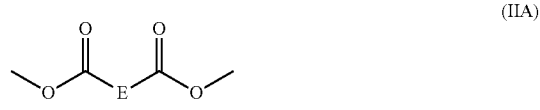

(IIA)

wherein E is as defined above. These polymers will also be herein after referred to as polyester (PE) polymers.

A further embodiment of the invention is represented by compositions containing polyacrylate polymers (herein after referred to as PA polymers) comprising blocks deriving from a PFPE acrylate, at least an acrylate and/or a 2-alkyl acrylate compound containing an ionisable anionic or cationic group or a precursor thereof and, optionally, a further non ionisable acrylate compound.

Chain ($R_{OF}$) in the (per)fluoropolyether block may advantageously comprise terminal bridging groups bound to the moiety of formula (I) or (II); such terminal bridging groups have formula —$CF_2CH_2(OCH_2CH_2)_{s'}$—, wherein s', equal or different at each occurrence, is 0 or an integer from 1 to 5.

For the avoidance of doubt, the binding between the bridging group and the —OC(O)— group in the above moieties of formulae (I) and (II) above is depicted in the following scheme:

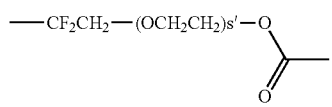

For the purposes of the present invention, suitable ionisable anionic groups are, for example, carboxylic acid groups of formula —COOH, sulphonic acid groups of formula —$SO_3H$, phosphoric acid groups of formula —$OPO_3H_2$, while suitable ionisable cationic groups are nitrogen-containing ionisable groups, such as amine groups, which may be either comprised in the chain ($R_H$) backbone, according to formula —$N(R_N)$—, wherein $R_N$ is selected from H and hydrocarbon groups having 1 to 6 carbon atoms, or comprised in side groups having formula —$N(R_{N1})(R_{N2})$, wherein $R_{N1}$ and $R_{N2}$, equal to or different from one another, are independently selected from hydrogen and hydrocarbon groups containing from 1 to 6 carbon atoms.

Preferably, a chain ($R_H$) comprising an ionisable anionic group has formula ($R'_{HC}$):

chain ($R'_{HC}$)

wherein T is a trivalent hydrocarbon group selected from a linear or branched $C_1$-$C_{12}$ hydrocarbon chain, a $C_3$-$C_{12}$ cycloaliphatic, $C_3$-$C_{12}$ heterocycloaliphatic, $C_5$-$C_{12}$ aromatic or $C_5$-$C_{12}$ heteroaromatic group. In PU and in PE polymers, chain ($R'_{HC}$) is preferably selected from any one of the followings:

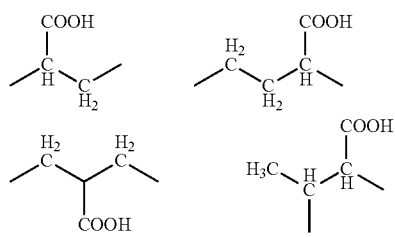

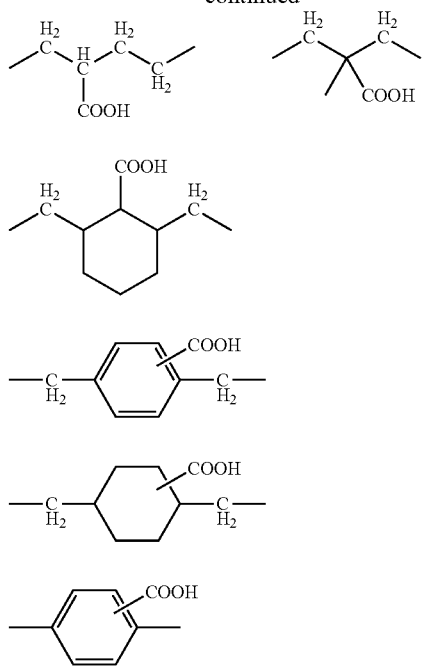

More preferably, chain ($R'_{HC}$) complies with formula:

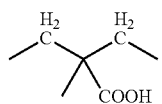

In PA polymers, chain $R'_{HC}$ preferably complies with formula:

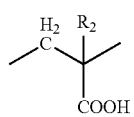

in which $R_2$ is H or a straight or branched $C_1$-$C_6$ hydrocarbon chain; more preferably, $R_2$ is hydrogen or methyl.

Preferably, a chain ($R_H$) comprising a ionisable group which forms a cationic group is an amine-containing chain of formula ($R''_{HC}$):

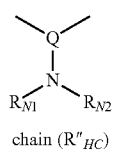

chain ($R''_{HC}$)

wherein $R_{N1}$ and $R_{N2}$ have the same meanings as defined above, Q is a trivalent hydrocarbon group selected from a linear or branched $C_1$-$C_{12}$ hydrocarbon chain, a $C_3$-$C_{12}$ cycloaliphatic, $C_3$-$C_{12}$ heterocycloaliphatic, $C_5$-$C_{12}$ aromatic or $C_5$-$C_{12}$ heteroaromatic group. In PU polymers and in PE polymers, chain ($R''_{HC}$) preferably complies with formula:

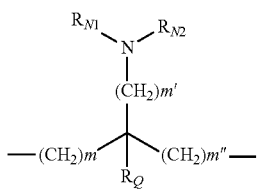

wherein $R_{N1}$ and $R_{N2}$ have the same meanings as defined above; more preferably, $R_{N1}$ and $R_{N2}$ are independently selected from linear or branched $C_1$-$C_4$ alkyl groups; m, m' and m" are 0 or a integers from 1 to 4, with the proviso that at least one of m and m" is not zero and $R_Q$ is H or a linear or branched $C_1$-$C_4$ alkyl group. Preferred amine-containing chains ($R''_{HC}$) are those of formulae —CH(CH$_2$—N(C$_2$H$_5$)$_2$)—CH$_2$— and —CH(CH$_2$—N(CH$_3$)$_2$)—CH$_2$—.

In PA polymers, chain ($R''_{HC}$) preferably complies with formula:

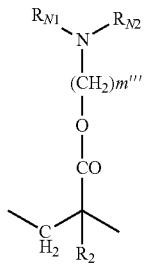

in which $R_{N1}$, $R_{N2}$ and $R_2$ are as defined above, while m''' is an integer ranging from 1 to 6. In a more preferred aspect, $R_{N1}$, $R_{N2}$ and $R_2$ are methyl and m''' is 2.

According to a further preferred aspect, in PU and PE polymers, a chain ($R_H$) comprising a ionisable group which forms a cationic group under appropriate pH conditions is an amine-containing chain of formula ($R'''_{HC}$):

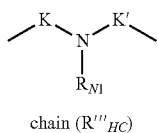

chain ($R'''_{HC}$)

wherein $R_{N1}$ has the same meanings defined above; preferably, $R_{N1}$ is selected from $C_1$-$C_4$ alkyl groups and K and K' are divalent hydrocarbon groups having from 1 to 6 carbon atoms.

In PU and PE polymers, the divalent hydrocarbon group E is preferably selected from:

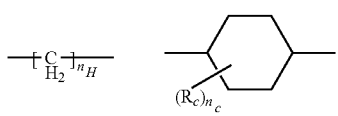

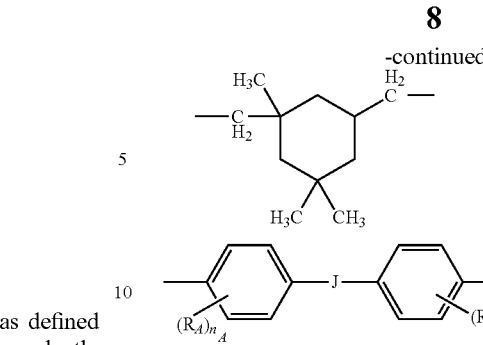

and mixtures thereof;
wherein:
$n_H$ is an integer from 1 to 12, preferably equal to 6;
J is a divalent bridging group selected from: a single bond; a methylene group (—CH$_2$—); an oxygen atom (—O—); a —C(CH$_3$)$_2$— group; a —C(CF$_3$)$_2$— group; a —SO$_2$— group; a —C(O)— group; preferably J is a methylene group;
each of $R_A$, $R_B$, $R_C$ and $R_D$, equal or different at each occurrence, is independently a halogen atom (e.g. Cl, Br, F), a $C_1$-$C_6$ hydrocarbon group (e.g. methyl, ethyl), a substituent group like notably —OR$_H$, —NR$_{H'}R_{H''}$, —C(O)—R$_{H'''}$, wherein $R_H$, $R_{H'}$, $R_{H''}$ and $R_{H'''}$, equal to or different from each other, are independently at each occurrence a hydrogen atom or a $C_1$-$C_6$ hydrocarbon group;
$n_A$, $n_B$ and $n_D$ are independently 0 or integers comprised between 1 and 4;
$n_C$ is 0 or an integer comprised between 1 and 10.

PU and PE polymers to be used in the compositions of the invention can be synthesised by reacting at least one hydroxy-terminated (per)fluoropolyoxyalkylene and at least one functionalised diol comprising at least one ionisable anionic or cationic group with at least one diisocyanate or at least one dicarboxylic acid, optionally in the presence of one or more chain-extenders.

In greater detail, the synthesis can be performed by reacting:
a) at least one hydroxy-terminated (per)fluoropolyoxyalkylene complying with formula (V) here below:

$$Z—O—R_{OF}—Y \qquad \text{of formula (V)}$$

wherein $R_{OF}$ is as defined above and Z and Y, equal to or different from each other, are independently functional hydroxyl groups complying with formula —CF$_2$CH$_2$O(CH$_2$CH$_2$O)$_{s'}$H, wherein s', equal or different at each occurrence, is 0 or an integer comprised between 1 and 5;
b) at least one functionalized diol comprising at least one ionisable group, having formula HO—R$_H$—OH, wherein $R_H$ has the same meanings as defined above; and
c) at least one diisocyanate of formula OCN—E—NCO or at least a dicarboxylic acid of formula HOOC—E—COOH or a reactive derivative thereof, wherein E is as defined above;
d) optionally, one or more chain extenders with a molecular weight of 60 to 450 g/mol selected from diols of formula HO—R$_{diol}$—OH and/or diamines of formula H$_2$N—R$_{diamine}$—NH$_2$, wherein $R_{diol}$ and $R_{diamine}$ are straight or branched $C_2$-$C_{14}$ hydrocarbon groups, optionally containing non-salifiable functional groups, such as hydroxyl or amino groups. If a diamine H$_2$N—R$_{diamine}$—NH$_2$ is used, polyurethane/polyamido polymers or polyester/polyamido polymers are obtained, depending on whether a diisocyanate OCN—E—NCO or a dicarboxylic acid HOOC—E—COOH is used. Furthermore, if $R_{diol}$ or $R_{diamine}$ in optional chain extenders HO—$R_{diol}$—OH and $H_2N$—$R_{diamine}$—$NH_2$ contain non-salifiable functional groups, like hydroxyl or amino groups, such groups may react with functional groups optionally present on the E moiety of diisocyanate OCN—E—NCO or acid HOOC—E—COOH, giving rise to polymeric networks.

For the purposes of the present description, a reactive derivative of a dicarboxylic acid of formula HOOC—E—COOH is, for example, an acyl chloride, bromide or iodide or an alkyl ester, typically a $C_1$-$C_4$ straight or branched alkyl ester.

The hydroxy-terminated (per)fluoropolyoxyalkylenes of formula (V) here above can be prepared starting from the corresponding (per)fluoropolyoxyalkylenes having —COF end groups as taught in GB 1104482 (MONTEDISON SPA) 28 Feb. 1968, U.S. Pat. No. 3,715,378 (MONTEDISON SPA) 6 Feb. 1973, U.S. Pat. No. 3,242,218 (DU PONT) 22 Mar. 1966, EP 239123 A (AUSIMONT SPA) 30 Sep. 1987, U.S. Pat. No. 5,149,842 (AUSIMONT SRL (IT)) 22 Sep. 1992, U.S. Pat. No. 5,258,110 (AUSIMONT SRL (IT)) 11 Feb. 1993. Preferred examples of hydroxy-terminated perfluoropolyethers are those marketed under the tradename Fomblin Z DOL®; most preferably, Fomblin Z DOL® perfluoropolyethers having molecular weight of 4000 g/mol or 2000 g/mol are used for the preparation of the compositions of the invention.

Diisocyanates of formula OCN—E—NCO are preferably selected from the followings: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylene-diisocyanate. According to a preferred embodiment, the diisocyanate is isophorone diisocyanate (IPDI).

Dicarboxylic acids of formula HOOC—E—COOH are preferably selected from $C_2$-$C_{20}$ alkylene dicarboxylic acids, cycloalkyl dicarboxylic acids, typically $C_3$-$C_{12}$cycloalkyl dicarboxylic acids, like cyclohexane dicarboxylic acid, preferably 1,4-cyclohexane dicarboxylic acid, aromatic dicarboxylic acids, typically $C_5$-$C_{12}$ aromatic dicarboxylic acids like terephthalic acid and naphthalene dicarboxylic acids.

The chain extender is preferably selected from an aliphatic diol or a (cyclo)aliphatic diamine with 2 to 14 carbon atoms. Non-limitative examples of suitable aliphatic diols notably include ethanediol, 1,4-butanediol, 1,6-hexanediol, diethylene glycol and dipropylene glycol. Non-limitative examples of suitable (cyclo)aliphatic diamines notably include isophoronediamine, ethylene diamine, 1,2-propylenediamine, 1,3-propylenediamine, N-methyl-propylene-1,3-diamine and N,N'-dimethylethylenediamine.

The chain extender may also be selected from diamines comprising a siloxane group of formula:

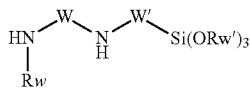

wherein:
$R_w$ and $R_{w'}$, equal to or different from each other, are independently selected from hydrogen and/or $C_1$-$C_6$ hydrocarbon groups, preferably $R_w$ being hydrogen and $R_{w'}$ being selected from $C_1$-$C_6$ hydrocarbon groups, W and W', equal to or different from each other, represent divalent hydrocarbon group having 1 to 12 carbon atoms.

Diamines comprising a siloxane group suitable for the purpose of the invention are notably those disclosed in EP 1559733 A (SOLVAY SOLEXIS SPA) 3 Aug. 2005. Non-limitative examples of siloxane-comprising diamines are notably N-(2-aminoethyl)-3-aminopropyltrimethoxysilane of formula: $H_2N$—$(CH_2)_2$—NH—$(CH_2)_3$—$Si(OCH_3)_3$, N-(2-aminoethyl)-2-aminoethyltrimethoxysilane of formula:

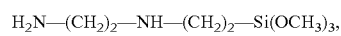

N-(3-aminopropyl)-3-aminopropyltrimethoxysilane of formula:

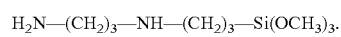

In greater detail, the synthesis of PU polymers (A) and (B) is performed, for example, by dissolving in a suitable organic solvent a hydroxy-terminated (per)fluoropolyoxyalkylene complying with formula (V) above and a diisocyanate of formula OCN—E—NCO, in which E is as defined above, in a suitable organic solvent, in the presence of a polymerization catalyst, typically dibutyltin dilaurate. Suitable organic solvents are ketones or acetates having a boiling point higher than 60° C., like methyl-ethyl-ketone and butyl acetate, partially fluorinated solvents like H-Galden® hydrofluoropolyether or hexafluoroxylene (HFX). The resulting mixture is usually heated up to a temperature ranging from 60 to 70° C. until the reaction (herein after referred to as polymerization reaction) is complete. Thereafter, a functionalized diol of formula HO—$R_H$—OH, optionally salified with a suitable salifying agent, dissolved in the same solvent as used in the polymerization reaction is added and the resulting mixture is heated again at a temperature ranging from 60 to 70° C. until the reaction (herein after referred to as extension reaction) is complete. A further chain extender of formula HO—$R_{diol}$—OH and/or of formula $H_2N$—$R_{diamine}$—$NH_2$, wherein $R_{diol}$ and $R_{diamine}$ are as defined above can be added in addition to the functionalised diol of formula HO—$R_H$—OH.

Salifying agents for the preparation of anionic polymers (A) are usually organic bases, typically amines. Examples of suitable amines are secondary or tertiary alkylamines that may contain further functional groups, such as triethylamine, diethanol amine and triethanolamine; according to a preferred embodiment, the amine is triethylamine. Inorganic bases like NaOH or KOH can also be used. An organic or inorganic base needs to be added for the synthesis of polymers (A) containing urethane moieites. Salifying agents for the preparation of cationic polymer (B) can be inorganic or organic acids; suitable organic acids are halide acids like HCl, while a preferred carboxylic acid is acetic acid.

Polyacrylate polymers to be used in the compositions of the present invention can be prepared by radical polimerization of a PFPE acrylate with at least one acrylate or 2-alkyl acrylate compound containing an ionisable anionic or cationic group as defined above and, optionally, a further non-ionisable acrylate derivative. In one preferred embodiment, the polymerization occurs between:

a') at least one (per)fluoropolyether complying with formula (VI) here below:

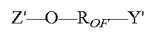 (VI)

wherein:
  $R_{OF}$ has the same meanings as defined above and
  one of Z' and Y' complies with formula:
    $CF_2CH_2O(CH_2CH_2O)_{s'}COCHR^1=CH_2$
  wherein s' and $R^1$ are as defined above and the other one is $CF_3$— or $CF_3CF_2$—;
b') at least one acrylate or 2-alkyl acrylate compound having formula (III) below:

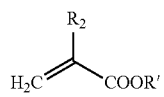

(III)

wherein R' is hydrogen or a straight or branched alkyl chain, typically a $C_1$-$C_4$ alkyl chain, or a chain of formula $(CH_2)_{m'''}$—$NR_{N1}R_{N2}$ and $R_2$ is as defined above; and, optionally
c') a further non-ionizable acrylate or 2-alkyl acrylate compound having formula (IV) below:

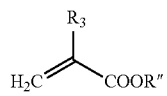

(IV)

in which $R_3$ is a $C_1$-$C_6$ straight or branched alkyl chain and R" is a $C_1$-$C_{18}$ straight or branched, saturated or unsaturated hydrocarbon chain in the presence of a radical polymerization initiator.

When a compound of formula (III) in which R' is a straight or branched alkyl chain is used, the reaction product between perfluoropolyether (IV) and compound (III) is submitted to hydrolysis of the ester group according to reactions known in the art.

The elastomeric compositions of the invention can be prepared either by mixing an aqueous dispersion of at least one polymer (A) with an aqueous dispersion of at least one polymer (B) (herein after referred to as dispersion precipitation method) or by hot mixing polymer (A) and polymer (B) (herein after referred to as hot mixing method). Polymer (A) and polymer (B) are mixed in such an amount as the ratio between the ionic equivalents of polymer (A) and the ionic equivalents of polymer (B) ranges from 1.1 to 0.9 and is preferably of 1. In other words, polymer (A) and polymer (B) are present is such an amount as the total number of negative charges borne by the ionisable anionic groups in polymer (A) is from 10% lower to 10% higher than the total number of positive charges borne by the ionisable cationic groups in polymer (B) or vice versa. Preferably, the total number of negative charges borne by the ionisable anionic groups in polymer (A) is the same as the total number of positive charges borne by the ionisable cationic groups in polymer (B).

The expression "aqueous dispersion of at least one polymer" identifies a dispersion of the polymer in water or in a water/organic solvent mixture. Typically, the polymer dispersion is obtained by addition of a salifying agent selected from those mentioned above.

In greater detail, the dispersion precipitation method envisages:
a) preparing a dispersion of a salt of at least one polymer (A) and a dispersion of a salt of at least one polymer (B) in water or a water/organic solvent mixture;
b) mixing together the two dispersions until complete precipitation of a polymer composition;
c) filtering off the precipitated polymer composition;
d) washing and drying the precipitated polymer composition.

For the preparation of polymer compositions comprising PU and PE polymers, step a) is typically accomplished by following a water-in-oil dispersion method, adding to the mixture obtained after the extension reaction water and an organic solvent different from that used in the polymerization and extension reactions.

The organic solvent for the preparation of the dispersions is usually selected from polyethers, acetates, alcohols, glycols and ketones, like ethanol, i-propanol, DMP (dipropylene glycol monomethyl ether) and NMP (n-methyl pirrolidone); according to a preferred embodiment, the solvent is i-propanol.

If a non salified diol HO—$R_H$—OH is used in the extension reaction, a salifying agent selected from any one of those mentioned above is also added.

For the preparation of polymer compositions comprising PA polymers, after polymerization, the reaction mixture is preferably added with an aqueous solution of a salifying agent as defined above and the organic solvent is evaporated.

Typically, stable dispersions of polymer (A) or (B) are obtained when the amount of water or water/organic solvent is such that the solid content in the dispersion ranges from 10 to 40% wt, preferably from 20 to 30% wt, but stable suspensions can also be obtained with a solid content as low as 1% wt. The weight ratio between water or water/organic solvent and the polymer may range from 1:99 to 199:1.

Preferably, the dispersions of polymer (A) and (B) are diluted before mixing by adding water in such an amount that the solid content ranges from 10 to 15% wt. A further organic solvent selected from those mentioned above can also be used as co-solvent. Complete precipitation of the composition is observed when the ratio between the ionic equivalents of polymer (A) and the ionic equivalents of polymer (B) ranges from 1 to 0.9 and is preferably of 1.

Once filtered off, the polymer composition containing polymers (A) and (B) can be dried, cast in a mould and pressed at a suitable temperature and pressure.

The hot mixing method envisages mixing polymer (A) and polymer (B) at a temperature usually ranging from 40 to 130° C., preferably from 100° to 120° C. for a time ranging from 15 to 60 min, so as to allow an acid-base reaction between polymer (A) and (B) to occur. Shorter times are required if salified polymers (A) and (B) are hot-mixed. For this purpose, polymers (A) and (B) are separated from the mixture resulting from the chain extension reaction or from the radical polymerisation reaction and dried. For the preparation of compositions comprising PU or PE polymers, polymers (A) and (B) are separated from the reaction mixture resulting from the chain extension reaction by adding an aqueous acid or a base, in such an amount as to neutralise any salified acid or basic groups in polymer (A) or (B). Suitable acids and bases are, for instance, those mentioned above as salifying agents, provided that the selected acid or base is stronger that that used in the chain-extension reaction. Addition of an acid or a base causes precipitation of the polymers, which can be filtered off and dried before being hot-mixed and pressed to obtain a formed material.

With particular regard to PU polymers obtained in the salified form, they can be recovered from the chain extension reaction mixture also by removing the solvent, adding a further organic solvent, typically a mixture of a partially fluorinate solvent (such as H-Galden® PFPE grade A, 1,3-bis (trifluoromethyl)benzene and HFE® 1700 hydrofluoroether)

with a non-fluorinated polar solvent like a ketone, typically, ethyl-ethyl-ketone, or an alcohol, typically ethanol or isopropanol, until a polymer solution is obtained; this polymer solution is subsequently washed with and aqueous acid or base. After washing, the polymer solution is dried, to provide a neutral PU polymer, which can be submitted to hot-mixing and pressing.

The compositions of the invention are endowed with elastomeric properties at room temperature and they can be used for manufacturing articles like sealing agents, gaskets and membranes or for manufacturing coatings that improve the mechanical and anti-scratch properties, the chemical resistance and/or hydro-oleo repellency of substrates like leather, paper or cotton.

It has also been observed that certain compositions of the invention obtained from anionic and cationic (per)fluoropolyethers wherein the (per)fluoropolyether chains have similar molecular weight are rubber-like materials endowed with self-healing properties at room temperature, i.e. they possess an intrinsic ability to repair mechanical damages without melting and cooling.

It has also been observed that the chemical resistance and the mechanical properties of the compositions of the invention are significantly higher than that of polymers (A) and (B) separately. For instance, while polymers (A) and (B) as such are soluble in water and in organic solvents like butyl acetate and methyl-ethyl-ketone, the compositions of the invention are not soluble.

The invention will be now illustrated in greater detail in the following non-limiting examples.

Should the disclosure of any patents, patent applications, and publications which are incorporated herein by reference conflict with the description of the present application to the extent that it may render a term unclear, the present description shall take precedence.

PREPARATIVE EXAMPLES

Materials and Methods

Azobisisobutyronitrile (AIBN), Isophorone diisocyanate (IPDI), dibutyltindilaurate (DBTDL), methyl-ethyl-ketone (MEK), triethylamine (TEA), dimethylolpropionic acid (DMPA), 1,2-propandiol (1,2-PD), diethylamine-propanediol (DEAPD), stearyl methacrylate, acrylic acid, dimethylaminomethyl methacrylate, acetic acid, AcOEt, i-PrOH have been purchased from Aldrich and they have been used as received.

Fomblin Z DOL® perfluoropolyethers: $HOCH_2CF_2(OCF_2CF_2O)_m(CF_2O)_nCF_2CH_2OH$ (m/n=2.0; MW 4000 and 2000) was obtained from Solvay.

$CF_3(OCF_2CF_2)_m(OCF_2)_nOCF_2CH_2O(O)CH=CH_2$ (MW 585) was prepared by reaction of $CF_3(OCF_2CF_2)_m(OCF_2)_nOCF_2CH_2OH$ (MW 543) with acrylic acid according to the procedure disclosed in EP 0622353 B (AUSIMONT S.P.A.).

Example 1

Dispersions of Anionic Polyurethane Obtained from Fomblin® Z DOL PFPE MW 4000 (Dispersion 1) and from Fomblin® Z DOL PFPE MW 2000 (Dispersion 2)

Step 1: Preparation of the Prepolymer

A glass reactor was charged with IPDI (11.1 g, 100 meq), Fomblin Z DOL® perfluoropolyether MW 4000 (100 g, 50 meq) and MEK (15 g). The reaction mass was warmed up to 50° C., under mechanical stirring, then dibutyltin dilaurate (DBTDL, 0.1 ml, 20% sol in AcOEt) was added; a spontaneous increase of the internal temperature to 55° C. was observed. Thereafter, the temperature was increased to 65° C. and kept at this value for two hours. The completion of the reaction was monitored by $^{19}F$ NMR.

Step 2: Chain-Extension

The internal temperature of the reaction mass was lowered to 50° C. and 15 ml of MEK were added, then temperature was increased again to 65° C. and dimethylol propionic acid (DMPA, 3.3 g, 49 meq), salified with an equivalent ratio of triethylamine (TEA) was added drop-wise, as a diluted solution in MEK.

The completion of the reaction was monitored by IR, until disappearance of the typical —NCO band (2225 $cm^{-1}$).

Step 3: Water Dispersion

The reaction mixture from step 2, containing the desired anionic polymer, was dispersed in water through the following oil-in-water procedure.

10 g i-PrOH was added to the mixture from step 2 and the resulting mixture was added drop-wise to 120 g water containing 80 g i-PrOH, while 240 g water was fed in a parallel way. A final stable dispersion, with a solid content of 25% was obtained.

A similar procedure was followed for the synthesis of the anionic PU dispersion (dispersion 2) based on Fomblin Z DOL® perfluoropolyether 2000 MW.

Example 2

Dispersions of Cationic Polyurethane Obtained from Fomblin® Z DOL PFPE MW 4000 (Dispersion 3) and from Fomblin® Z DOL PFPE MW 2000 (Dispersion 4)

Step 1: Prepolymer

A glass reactor was charged with IPDI (11.1 g, 100 meq), Fomblin®Z DOL perfluoropolyether MW 4000 (100 g, 50 meq) and MEK (15 g). The reaction mass was warmed up to 50° C., under mechanical stirring, then DBTDL (0.1 ml, 20% sol in AcOEt) was added. A spontaneous increase of the internal temperature to 55° C. was observed. Thereafter, the temperature was increased to 65° C. and kept at this value for two hours. The completion of the reaction was monitored by $^{19}F$ NMR.

Step 2: Chain-Extension

The internal temperature or the reaction mixture from step 1 was lowered to 50° C. and 15 ml MEK were added. The temperature was increased again to 65° C. and 1,2-PD (0.9 g, 25 meq), together with DEAPD (1.8 g, 25 meq) was added drop-wise as a diluted solution in MEK.

The completion of the reaction was monitored by IR, until disappearance of the typical —NCO band (2225 $cm^{-1}$).

Step 3: Water Dispersion

The reaction product from step 2 was dispersed in water through the following oil-in-water procedure.

The reaction mass from step 2 was added with 10 g i-PrOH and with glacial acetic acid (50% excess with respect to the amine equivalents), then it was stirred for 1 hour at 30° C.

This polymeric mass was added drop-wise to 120 g water containing 80 g i-PrOH, while 240 g water were fed in parallel; a final stable dispersion, with a solid content of 25% was obtained.

A similar procedure was followed for the synthesis of the cationic PU dispersion 4 based on Fomblin® Z DOL perfluoropolyether of MW 2000.

Example 3

Preparation of Polymeric Composition 1 by Hot Mixing

The polyurethane dispersion 1 obtained according to example 1 was precipitated by addition of a HCl water solution, while the polyurethane water dispersion 3 obtained according to example 2 was precipitated by addition of an excess TEA.

Both precipitated, non salified polymers were washed several times with water and dried under vacuum at 80° C. for 12 hours, then 25.4 g anionic polymer and 50.7 gr cationic polymer (10 meq —COOH groups:10 meq amino groups; equivalent ratio=1) were mixed in a hot mixer at 120° C. for 4 hrs.

Finally, the polymeric mass was cast in a mould and put in a press at 120° C. for 30' at 200 bar; a rubber-like slab of ionic polymeric compositions, having self-healing properties was obtained.

Example 4

Preparation of Polymer Composition 2 by Dispersion Precipitation

Polyurethane dispersions 2 and 4 were diluted with water to 12% w/w, then diluted dispersion 2 was slowly added to diluted dispersion 4 in such an amount as the ratio between the equivalents of the polymer in dispersion 2 and the equivalents in dispersion 4 was 1, i.e. until full balance between of the charges on the anionic and cationic polymer was reached (acid-base titration).

A precipitate immediately formed, while triethylammonium acetate remained in solution in the water phase.

The precipitate, consisting of the desired polymeric composition, was isolated by filtration, washed several times with water and dried under vacuum at 80° C.

The product was moulded in a press at 120° C. for 30' at 200 bar, to provide a rubber-like slab of ionic polymeric composition, having self-healing properties.

Example 5

Preparation of Polymer Composition 3 by Hot Mixing

This composition was prepared accordingly to the procedure described in example 3, starting from PU dispersion 2 and PU dispersion 3.

Example 6

Preparation of Polymer Composition 4 by Hot Mixing

This composition was prepared accordingly to the procedure described in example 3, starting from PU dispersion 1 and PU dispersion 4.

Example 7

Aqueous Dispersion of a Cationic Polyacrylate Polymer

A 500 ml, round-bottom flask was charged with AIBN (0.28 g, 0.0017 mol), stearyl methacrylate (50.38 g, 0.149 mol), a perfluoropolyether of formula $CF_3(OCF_2CF_2)_m(OCF_2)_nOCF_2CH_2O(O)CH=CH_2$ (17.41 g, 0.0297 mol, PM 585), dimethylaminoethyl methacrylate (1.40 g, 0.009 mol) and MEK (105 g), under nitrogen atmosphere. The resulting mixture was stirred for about 30 min at room temperature, then the temperature was raised to 70° C. and the mixture was stirred for further 16 hours at this temperature. Thereafter, the reaction mixture was cooled down to room temperature and added dropwise with an aqueous solution of acetic acid (0.54 g in 163 grams water) during a time period of two hours. After completion of the addition, the solvent was evaporated and a water dispersion containing 30% wt polymer with an amount of salified groups (expressed as N+) of 12.8 mmol/100 g dry polymer and an amount of fluorine of 14.94% wt with respect to the dry polymer was obtained.

Example 8

Aqueous Dispersion of an Anionic Polyacrylate Polymer

A 500 ml, round-bottom flask was charged with AIBN (0.28 g, 0.017 mol), stearyl methacrylate (50.66 g, 0.15 mol), a perfluoropolyether of formula $CF_3(OCF_2CF_2)_m(OCF_2)_nOCF_2CH_2O(O)CH=CH_2$ (17.41 g, 0.0297 mol, PM 585), acrylic acid (0.65 g, 0.093 mol) and MEK (105 g) under nitrogen atmosphere. The resulting mixture was stirred for about 30 min at room temperature, then the temperature was raised to 70° C. and the mixture was stirred for further 16 hours at this temperature. Thereafter, the reaction mixture was cooled down to room temperature and added dropwise under vigorous stirring with an aqueous solution of TEA (0.91 g in 163 g water) during a time period of 2 hours. After completion of the addition, the solvent was evaporated and a water dispersion containing 30% wt polymer, with an amount of salified groups (expressed as COO—) of 12.8 mmol/100 g and a fluorine content of 15.02% (g F/g polymer) was obtained.

Example 9

Preparation of Polymer Composition 5 by Dispersion Precipitation

The aqueous dispersions of examples 7 and 8 were diluted to 12% wt by addition of water; thereafter, the diluted dispersion from example 8 was slowly added to 100 g diluted dispersion from example 7. Formation of a precipitate, consisting of a polymer composition of anionic and cationic acrylic polymers, was immediately observed. The addition of the anionic polymer was continued until the ratio between the equivalents of cationic polymer to anionic polymer was 1, i.e. until full balance of the opposite charges on the anionic and cationic polymers was reached (acid-base titration); thereafter, the precipitated composition was filtered, thoroughly washed with water and dried under vacuum at 80° C. This dried composition was cast in a mould and pressed at 120° C. for 30 min at 200 bar, to provide a rubber-like slab of ionic polymeric composition, having self-healing properties.

Evaluation Tests

Test 1—Chemical Resistance

The chemical resistance of compositions 1 and 2, obtained according to examples 3 and 4, was evaluated by comparing their swelling percentage in water with the swelling percentage of a composition obtained according to US 2009/0062551 and with the swelling percentage of polymers (A) and (B) alone. The results, reported in Table 1 below, confirm the higher chemical resistance of compositions 1 and 2.

TABLE 1

| Material | hours | H20 (%) |
|---|---|---|
| Composition 1 | 24 | 1.2 |
| Composition 2 | 24 | 5.5 |
| Composition according to US 2009/0062551 | 24 | 42 |
| Anionic PU isolated from dispersion 2 | 24 | 30 |
| Anionic PU isolated from dispersion 1 | 24 | 6.8 |
| Cationic PU isolated from dispersion 3 | 24 | 42 |
| Cationic PU isolated from dispersion 4 | 24 | 42 |

Test 2—Calorimetric Behaviour

The calorimetric data acquired by DSC analysis on compositions 1 and 2 and on a composition according to US 2009/0062551 are reported in Table 2 below. It can be observed that, unlike the composition of US 2009/0062551, which, due to its a higher Tg value, performs like a plastic material at room temperature, compostions 1 and 2 show lower $Tg_s$ values, well below room temperature, due to the fluorinated amorphous phase; as a consequence, they behave like elastomers at room temperature. Comparative data with respect to polymers (A) and (B) alone has not been provided, because these material are not dimensionally stable and do not have significant tensile stress.

TABLE 2

| Material | TgF (° C.) | TgH (° C.) |
|---|---|---|
| Composition 1 | | |
| Composition 2 | −107 (0.10 J/g C.) | 26 (0.26 J/g C.) |
| Composition 3 | −112 (0.18 J/g C.) | 14 (0.17 J/g C.) |
| Composition according to US 2009/0062551 | — | 28 |

Test 3—Tensile Behaviour

The tensile properties of compositions 1-4 were evaluated according to DIN 53504 (test-piece S2; rate 200 mm/min); the results are summarised in table 2 below:

TABLE 3

| Composition | Stress at 50% strain [Mpa] | Stress at 100% strain [Mpa] | Stress at 200% strain [Mpa] | Maximum stress [Mpa] | Stress at break [Mpa] | Strain at break [%] |
|---|---|---|---|---|---|---|
| Composition 1 | — | — | — | 0.2 | 0.07 | 800 |
| Composition 2 | 3.8 | 4 | 4.5 | 9.4 (0.2) | 9.4 (0.2) | 766 (23) |
| Composition 3 | 1.7 | 2 | 2.4 | 3.4 | 3.4 | 522 (44) |
| Composition 4 | 1.1 | 1.3 | 1.5 | 3.2 (0.1) | 3.2 (0.1) | 794 (26) |

Test 4—Thermal Stability

The thermal stability of compositions 1-4 was evaluated by TGA on 10 mg samples. A first run was performed in dry hair flow (50 cc/min) under isothermal conditions at 30° C. for 5 minutes. Thereafter, the temperature was raised to 800° C. at 10° C./min and a second isothermal run at 800° C. for 15 minutes was performed. The weight loss curve was obtained with 1%, 2%, 5% and 10% weight loss temperatures.

The results, reported in table 4 below, show that for all compositions a weight loss of 2% was observed only at a temperature equal to or higher than 230° C.

TABLE 5

| | Composition 1 | Composition 2 | Composition 3 | Composition 4 |
|---|---|---|---|---|
| Temperature at which 1% weight loss is observed | 206 | 215 | 214 | 189 |
| Temperature at which 2% weight loss is observed 2% | 247 | 239 | 239 | 230 |
| Temperature at which 10% weight loss is observed | 289 | 269 | 270 | 273 |
| Temperature at which 50% weight loss is observed | 333 | 301 | 312 | 312 |

The invention claimed is:

1. A polymer composition comprising:
   a) at least one fluorinated ionisable polymer (A), which comprises recurring fluorinated blocks and recurring functional blocks, each of said recurring functional blocks comprising at least one ionisable anionic group, and wherein at least one of said recurring functional blocks of polymer (A) is between two fluorinated blocks;
   b) at least one fluorinated ionisable polymer (B), which comprises recurring fluorinated blocks and recurring functional blocks, each of said recurring functional blocks comprising at least one ionisable cationic group, and wherein at least one of the said recurring functional blocks of polymer (B) is between two fluorinated blocks;
   wherein the ratio between the ionic equivalents of polymer (A) and the ionic equivalents of polymer (B) ranges from 1.1 to 0.9.

2. A polymer composition according to claim 1, wherein the fluorinated blocks are (per)fluoropolyether blocks comprising a (per)fluoropolyoxyalkylene chain that comprises one or more repeating units R° selected from:
   (i) —CFXO—, wherein X is F or $CF_3$;
   (ii) —$CF_2$CFXO—, wherein X is F or $CF_3$;
   (iii) —$CF_2CF_2CF_2O$—; or
   (iv) —$CF_2CF_2CF_2CF_2O$—.

3. A polymer composition according to claim 1, wherein the fluorinated blocks and the functional blocks in fluorinated ionisable polymers (A) and (B) are linked together through a moiety formula (I):

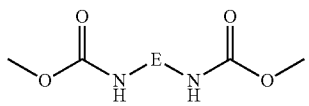

wherein E is a divalent hydrocarbon group, linear or branched, optionally comprising one or more cycloaliphatic or aromatic groups and/or one or more functional groups or through a moiety of formula (II):

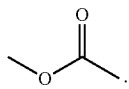

4. A polymer composition according to claim 3, wherein the fluorinated ionisable polymers (A) and (B) are polyester polymers in which the fluorinated blocks and the functional blocks are linked together through a moiety of formula (IIA):

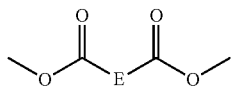

wherein E is a divalent hydrocarbon group, linear or branched, optionally comprising one or more cycloaliphatic or aromatic groups and/or one or more functional groups.

5. A polymer composition according to claim 1, wherein polymers (A) and (B) are polyacrylate polymers comprising blocks derived from a PFPE acrylate, at least an acrylate and/or a 2-alkyl acrylate compound containing an ionisable anionic or cationic group or a precursor thereof and, optionally, a further non ionisable acrylate and/or 2-alkyl acrylate compound.

6. A polymer composition according to claim 3, wherein E is selected from:

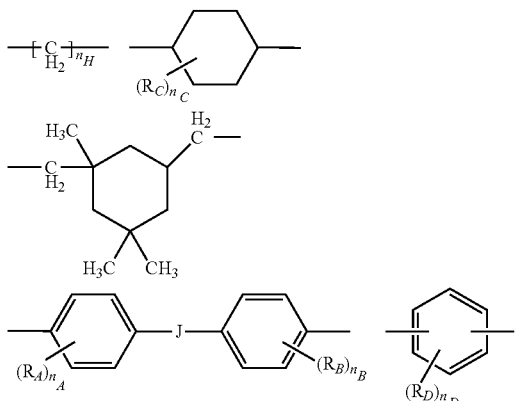

and mixtures thereof;
wherein:
$n_H$ is an integer from 1 to 12;
J is a divalent bridging group selected from: a single bond; a methylene group ($-CH_2-$); an oxygen atom ($-O-$); a $-C(CH_3)_2-$ group; a $-C(CF_3)_2-$ group; a $-SO_2-$ group; or a $-C(O)-$ group;

each of $R_A$, $R_B$, $R_C$ and $R_D$, equal or different at each occurrence, is independently a halogen atom, a $C_1$-$C_6$ hydrocarbon group, a substituent group selected from $-OR_H$, $-NR_HR_{H'}$, or $-C(O)-R_{H'''}$, wherein $R_H$, $R_HR_H''$ and $R_H'''$, equal to or different from each other, are independently at each occurrence a hydrogen atom or a $C_1$-$C_6$ hydrocarbon group;

$n_A$, $n_B$ and $n_D$ are independently integers comprised between 0 and 4;

$n_C$ is an integer comprised between 0 and 10.

7. A polymer composition according to claim 3, wherein the functional blocks comprising at least one ionisable anionic group comprise a carboxy-containing chain ($R'_{HC}$) of formula:

chain ($R'_{HC}$)

wherein T is a hydrocarbon trivalent group selected from a linear or branched $C_1$-$C_{12}$ hydrocarbon chain, a $C_3$-$C_{12}$ cycloaliphatic group, a $C_5$-$C_{12}$ aromatic or a $C_5$-$C_{12}$ heteroaromatic group.

8. A polymer composition according to claim 3, wherein the functional block comprising at least one ionisable cationic group comprises an amine-containing chain of formula ($R''_{HC}$)

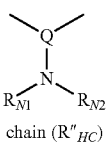

chain ($R''_{HC}$)

wherein $R_{N1}$ and $R_{N2}$, equal to or different from one another, are independently selected from hydrogen and hydrocarbon groups containing from 1 to 6 carbon atoms, Q is an hydrocarbon trivalent group selected from a linear or branched $C_1$-$C_{12}$ hydrocarbon chain, a $C_3$-$C_{12}$ cycloaliphatic group, a $C_5$-$C_{12}$ aromatic or a $C_5$-$C_{12}$ heteroaromatic group.

9. A polymer composition according to claim 3, wherein the functional block comprising at least one ionisable cationic group comprises an amine-containing chain of formula ($R'''_{HC}$):

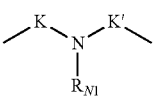

chain ($R'''_{HC}$)

wherein $R_{N1}$ is hydrogen or a hydrocarbon group containing from 1 to 6 carbon atoms and K and K' are divalent hydrocarbon groups having from 1 to 6 carbon atoms.

10. A polymer composition according to claim 5, wherein the functional block comprising at least one ionisable anionic group is a carboxy-containing chain of formula:

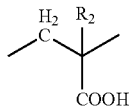

wherein $R_2$ is hydrogen or a straight or branched $C_1$-$C_6$ hydrocarbon chain.

11. A polymer composition according to claim 5, wherein the functional block comprising at least one ionisable cationic group is an amine-containing chain of formula:

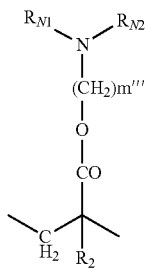

wherein $R_{N1}$ and $R_{N2}$, equal to or different from one another, are independently selected from hydrogen and hydrocarbon groups containing from 1 to 6 carbon atoms, $R_2$ is hydrogen or a straight or branched $C_1$-$C_6$ hydrocarbon chain and m''' is an integer from 2 to 6.

12. A method for preparing a polymer composition according to claim 1 which comprises:
  a) preparing a dispersion of at least one polymer (A) and a dispersion of at least one polymer (B) in water or in a mixture of water and an organic solvent;
  b) mixing together the dispersion of polymer (A) and the dispersion of polymer (B) until complete precipitation of a solid polymer composition;
  c) filtering off the precipitated solid polymer composition;
  d) washing and drying the precipitated polymer composition.

13. A method for preparing a polymer composition according to claim 1 which comprises hot mixing at least one polymer (A) and at least one polymer (B).

14. A method for sealing an agent, gasket, membrane or coating comprising applying a polymer composition according to claim 1 to the agent, gasket, membrane or coating.

15. A Sealing agent, gasket, membrane or coating comprising a polymer composition according to claim 1.

16. A polymer composition according to claim 4, wherein E is selected from:

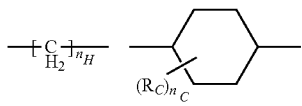

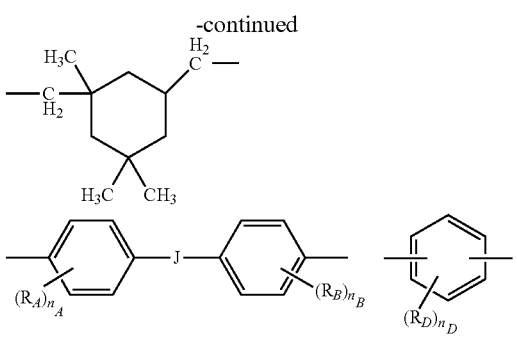

and mixtures thereof;
wherein:
  $n_H$ is an integer from 1 to 12;
  J is a divalent bridging group selected from: a single bond; a methylene group (—$CH_2$—); an oxygen atom (—O—); a —$C(CH_3)_2$— group; a —$C(CF_3)_2$— group; a —$SO_2$— group; or a —C(O)— group;
  each of $R_A$, $R_B$, $R_C$ and $R_D$, equal or different at each occurrence, is independently a halogen atom, a $C_1$-$C_6$ hydrocarbon group, a substituent group selected from —$OR_H$, —$NR_H R_{H'''}$, or —C(O)—$R_{H''''}$, wherein $R_H$, $R_{H'}$, $R_{H''}$ and $R_{H'''}$, equal to or different from each other, are independently at each occurrence a hydrogen atom or a $C_1$-$C_6$ hydrocarbon group;
  $n_A$, $n_B$ and $n_D$ are independently integers comprised between 0 and 4;
  $n_C$ is an integer comprised between 0 and 10.

17. A polymer composition according to claim 4, wherein the functional blocks comprising at least one ionisable anionic group comprise a carboxy-containing chain ($R'_{HC}$) of formula:

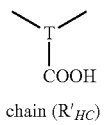

chain ($R'_{HC}$)

wherein T is a hydrocarbon trivalent group selected from a linear or branched $C_1$-$C_{12}$ hydrocarbon chain, a $C_3$-$C_{12}$ cycloaliphatic group, a $C_5$-$C_{12}$ aromatic or a $C_5$-$C_{12}$ heteroaromatic group.

18. A polymer composition according to claim 4, wherein the functional block comprising at least one ionisable cationic group comprises an amine-containing chain of formula ($R''_{HC}$)

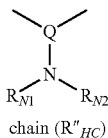

chain ($R''_{HC}$)

wherein $R_{N1}$ and $R_{N2}$, equal to or different from one another, are independently selected from hydrogen and hydrocarbon groups containing from 1 to 6 carbon atoms, Q is an hydrocarbon trivalent group selected from a linear or branched $C_1$-$C_{12}$ hydrocarbon chain, a $C_3$-$C_{12}$ cycloaliphatic group, a $C_5$-$C_{12}$ aromatic or a $C_5$-$C_{12}$ heteroaromatic group.

19. A polymer composition according to claim 4, wherein the functional block comprising at least one ionisable cationic group comprises an amine-containing chain of formula ($R'''_{HC}$):
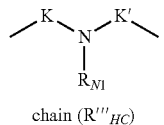
chain ($R'''_{HC}$)
wherein $R_{N1}$ is hydrogen or a hydrocarbon group containing from 1 to 6 carbon atoms and K and K' are divalent hydrocarbon groups having from 1 to 6 carbon atoms.
* * * * *